(12) United States Patent
Dolan-Gavitt et al.

(10) Patent No.: US 9,619,654 B2
(45) Date of Patent: *Apr. 11, 2017

(54) APPLICATION MONITORING THROUGH COLLECTIVE RECORD AND REPLAY

(71) Applicant: Microsoft Technology Licensing, LLC, Redmond, WA (US)

(72) Inventors: Brendan Dolan-Gavitt, Atlanta, GA (US); David Alexander Molnar, Redmond, WA (US); Weidong Cui, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 49 days.

This patent is subject to a terminal disclaimer.

(21) Appl. No.: 14/611,059

(22) Filed: Jan. 30, 2015

(65) Prior Publication Data

US 2015/0150138 A1   May 28, 2015

Related U.S. Application Data

(63) Continuation of application No. 13/325,062, filed on Dec. 14, 2011, now Pat. No. 8,955,114.

(51) Int. Cl.

| | |
|---|---|
| *H04L 29/06* | (2006.01) |
| *G06F 21/57* | (2013.01) |
| *G06F 21/55* | (2013.01) |
| *G06F 21/56* | (2013.01) |
| *G06F 21/62* | (2013.01) |
| *G06F 21/52* | (2013.01) |
| *G06F 11/34* | (2006.01) |

(52) U.S. Cl.
CPC ........ *G06F 21/577* (2013.01); *G06F 11/3414* (2013.01); *G06F 11/3466* (2013.01); *G06F 21/52* (2013.01); *G06F 21/552* (2013.01); *G06F 21/566* (2013.01); *G06F 21/6281* (2013.01); *G06F 11/3476* (2013.01); *G06F 2201/865* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 6,145,121 | A | 11/2000 | Levy et al. |
| 7,096,499 | B2 | 8/2006 | Munson |
| 7,185,366 | B2 | 2/2007 | Mukai et al. |
| 7,185,367 | B2 | 2/2007 | Munson |
| 7,571,478 | B2 | 8/2009 | Munson et al. |

(Continued)

OTHER PUBLICATIONS

Xu, "Retrace Collecting Execution Trace with Virtual Machine Deterministic Replay", 2007, pp. 1-8.
Monrose, Distributed Exectio with Remote Audit, 1999, pp. 1-4.
Chen, et al., "When Virtual Is Better Than Real", Retrieved at <<http://citeseerx.ist.psu.edu/viewdoc/download?doi=10.1.1.74.

(Continued)

*Primary Examiner* — Benjamin Lanier
(74) *Attorney, Agent, or Firm* — International IP Law Group, PLLC

(57) ABSTRACT

Methods and systems for application monitoring through collective record and replay are disclosed herein. The method includes recording a number of execution traces for an application from a number of user devices at a runtime library, wherein the number of execution traces relates to non-deterministic data. The method also includes replaying the number of execution traces to determine whether a behavior of the application creates a security risk.

19 Claims, 5 Drawing Sheets

(56) References Cited

U.S. PATENT DOCUMENTS

| | | |
|---|---|---|
| 7,574,711 B2 | 8/2009 | Zondervan et al. |
| 7,594,272 B1 | 9/2009 | Kennedy et al. |
| 7,844,954 B2 | 11/2010 | Venkitachalam et al. |
| 8,028,336 B2 | 9/2011 | Schuba et al. |
| 8,145,669 B2 | 3/2012 | Cormode et al. |
| 8,205,239 B1 | 6/2012 | Satish et al. |
| 8,205,257 B1 | 6/2012 | Satish et al. |
| 8,266,638 B2 | 9/2012 | Sim et al. |
| 8,285,999 B1 | 10/2012 | Ghose et al. |
| 2003/0121027 A1 | 6/2003 | Hines |
| 2009/0165135 A1 | 6/2009 | Lomont et al. |
| 2010/0212012 A1 | 8/2010 | Touboul et al. |
| 2011/0145223 A1 | 6/2011 | Cormode et al. |
| 2011/0219447 A1 | 9/2011 | Horovitz et al. |
| 2012/0278658 A1 | 11/2012 | Han et al. |

OTHER PUBLICATIONS

9249&rep=rep1&type=pdf>>, Proceedings of the 8th Workshop on Hot Topics in Operating Systems (HOTOS), May 20-22, 2011, pp. 6.

Srivastava, et al., "Efficient Monitoring of Untrusted Kernel-Mode Execution", Retrieved at <<http://www.isoc.org/isoc/conferences/ndss/11/pdf/3_2.pdf>>, Proceedings of the 18th Network and Distributed System Security Symposium (NDSS), Feb. 6-9, 2011, pp. 18.

Jana, et al., "TxBox: Building Secure, Efficient Sandboxes with System Transactions", Retrieved at <<http://www.cs.utexas.edu/~shmat/shmat_oak11txbox.pdf>>, IEEE Symposium on Security and Privacy, May 2011, pp. 329-344.

Kiciman, et al., "AjaxScope: A Platform for Remotely Monitoring the Client-Side Behavior of Web 2.0 Applications", Retrieved at <<http://research.microsoft.com/en-us/groups/rad/sosp07.pdf>>, Proceedings of twenty-first ACM SIGOPS symposium on Operating systems principles (SOSP), Oct. 14-17, 2007, pp. 14.

300

400

US 9,619,654 B2

APPLICATION MONITORING THROUGH COLLECTIVE RECORD AND REPLAY

CROSS-REFERENCE TO RELATED APPLICATIONS

This application is a continuation of co-pending U.S. patent application Ser. No. 13/325,062, filed Dec. 14, 2011 which is entitled "Application Monitoring Through Collective Record and Replay," the application of which is incorporated herein by this reference as though fully set forth herein.

BACKGROUND

Many multi-user operating systems associate privileges with user accounts. When a user installs an application, the application runs in the name of the user and inherits the user's ability to access the system resources. However, modern browsers and device operating systems, such as smartphone operating systems, often treat applications as mutually-untrusting, potentially-malicious principals. In most cases, applications are isolated except for explicit inter-process, or inter-application, communication (IPC) channels. In addition, applications can be unprivileged by default, requiring user permission for additional privileges. In other words, permission to use devices and access user-private data through system application programming interfaces (APIs) may be granted to individual applications by the user.

However, modern permission systems may be undermined by the presence of malicious software within applications. Such malicious software may compromise users' privacy or violate platform providers' security policies. Current approaches focus on preventing malicious applications from reaching end users through manual review of each application that is added to the marketplace. However, this process is costly and time-consuming. Moreover, although approaches exist for monitoring applications in the wild, such as event logging and crash reports or online taint flow analysis, these methods are limited by either the small quantity of data collected or the high performance overhead on the end user.

SUMMARY

The following presents a simplified summary of the innovation in order to provide a basic understanding of some aspects described herein. This summary is not an extensive overview of the claimed subject matter. It is intended to neither identify key nor critical elements of the claimed subject matter nor delineate the scope of the subject innovation. Its sole purpose is to present some concepts of the claimed subject matter in a simplified form as a prelude to the more detailed description that is presented later.

An embodiment provides a method for application monitoring through collective record and replay. The method includes recording a number of execution traces for an application from a number of user devices at a runtime library, wherein the number of execution traces relates to non-deterministic data. The method also includes replaying the number of execution traces to determine whether a behavior of the application creates a security risk.

Another embodiment provides a system for application monitoring through collective record and replay. The system includes an application configured to send a number of execution traces to a central server(s) from a number of user devices, wherein the number of execution traces relates to non-deterministic data. The system also includes a runtime library configured to redirect the number of execution traces from the API to the runtime library, record the number of execution traces on a memory device, and replay the number of execution traces to determine whether the application is functioning as expected.

In addition, another embodiment provides one or more non-transitory, computer-readable storage media for storing computer readable instructions, the computer-readable instructions providing a collective record and replay system when executed by one or more processing devices. The computer-readable instructions comprising code configured to perform probabilistic logging for an application to record a number of execution traces relating to non-deterministic data from a number of user devices. The computer-readable instructions also include code configured to determine whether the application is utilizing the number of non-deterministic data for an unexpected purpose by replaying the number of executions traces.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
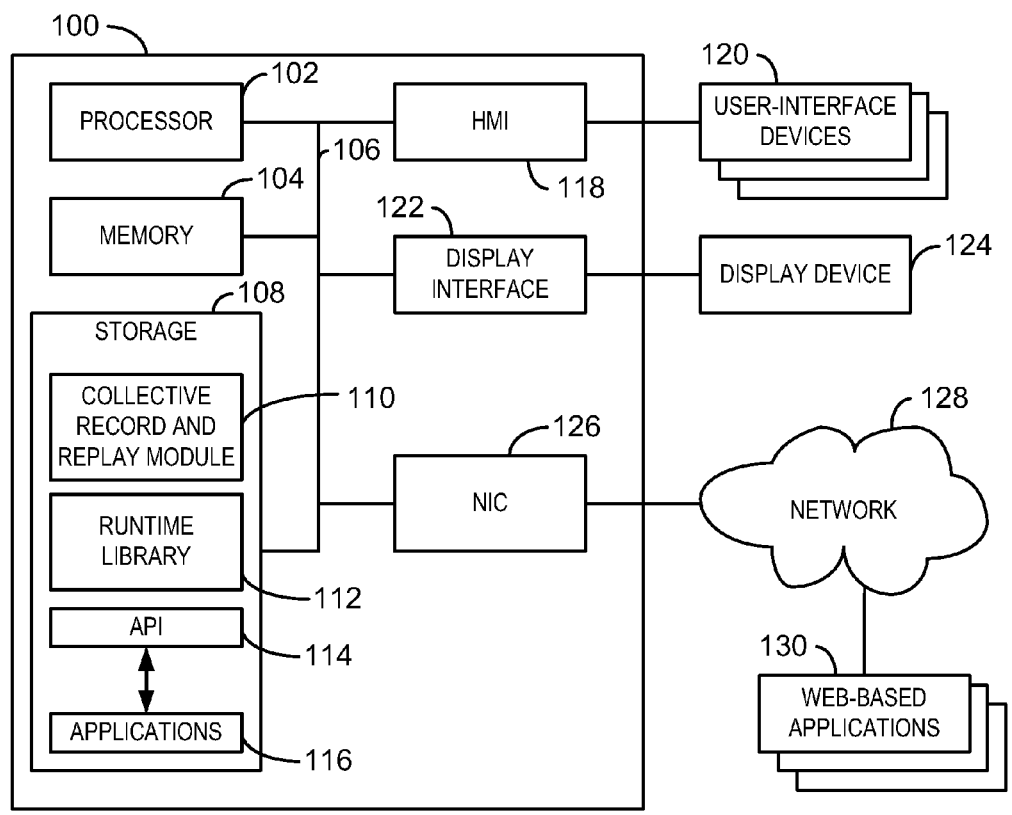
FIG. 1 is a block diagram of an exemplary system that may monitor potentially-malicious applications through the implementation of a collective record and replay procedure.

The same numbers are used throughout the disclosure and figures to reference like components and features. Numbers in the 100 series refer to features originally found in FIG. 1, numbers in the 200 series refer to features originally found in FIG. 2, numbers in the 300 series refer to features originally found in FIG. 3, and so on.

DETAILED DESCRIPTION

As discussed above, many modern applications include malicious software that violates the privacy of users and the security policies of platform providers. Such malicious software may gain access to users' private data through several different mechanisms. In some instances, a developer of an application may intentionally exploit user-private data for unauthorized or illegal purposes. In other instances, an application may unintentionally expose user-private data to potentially-malicious applications or third parties. In various embodiments, user-private data may be considered to be any data that is non-deterministic, or variable. The protection of such non-deterministic data from malicious applications may ensure that users' privacy rights are not violated.

Embodiments disclosed herein set forth a method and system for application monitoring through collective record and replay. The applications may include, for example, smartphone applications implemented on a mobile phone or Web applications implemented on a Web site, among others. Moreover, the applications may also include any types of computer programs which execute code that is related to any form of non-deterministic data. Such a method and system may prevent applications from performing actions that are not desired by the user, particularly in relation to non-deterministic data.

To implement the collective record and replay procedure, a number of execution traces for a particular application may be collectively recorded at a centralized location, referred to herein as a runtime library, from a number of different user devices. As used herein, an "execution trace" is a sequence of application programming interface (API) calls and non-deterministic data related to the API calls made by an application. Moreover, the execution traces may be recorded from a number of different user devices based on an assigned probability. The assigned probability may dictate the number of execution traces which are recorded from each user device and, thus, may determine the performance overhead of the collective recording procedure. When a partial execution trace is recorded, the assigned probability may also be used to decide whether to record the non-deterministic data related to a given API call. The assigned probability can be either API independent (i.e., all APIs have the same record/not-record probability) or API dependent (i.e., every API has its own record/not-record probability).

In various embodiments, the data recorded may include both the parameters passed to the API and the data returned from the API. Furthermore, partial execution traces may be probabilistically recorded in order to reduce the overhead cost. Once the execution traces have been recorded, they may be aggregated, replayed, and analyzed in order to determine whether the particular application is likely to be using the non-deterministic data for malicious purposes. Moreover, if it is determined that the application is likely to be malicious, the application may be blocked from the marketplace or removed from the user devices, or both.

As a preliminary matter, some of the figures describe concepts in the context of one or more structural components, variously referred to as functionality, modules, features, elements, etc. The various components shown in the figures can be implemented in any manner, for example, by software, hardware (e.g., discreet logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks.

The blocks shown in the flowcharts can be implemented by software, hardware, firmware, manual processing, and the like, or any combination of these implementations. As used herein, hardware may include computer systems, discreet logic components, such as application specific integrated circuits (ASICs), and the like, as well as any combinations thereof.

As to terminology, the phrase "configured to" encompasses any way that any kind of functionality can be constructed to perform an identified operation. The functionality can be configured to perform an operation using, for instance, software, hardware, firmware and the like, or any combinations thereof.

The term "logic" encompasses any functionality for performing a task. For instance, each operation illustrated in the flowcharts corresponds to logic for performing that operation. An operation can be performed using, for instance, software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an exemplary system 100 that may monitor potentially-malicious applications through the implementation of a collective record and replay procedure. The system 100 may be included within a computing device, such as, for example, a mobile phone, a tablet, a desktop computer, a laptop computer, an electronic reader, a television, or a media player, or any combinations thereof. Moreover, the system 100 may implemented within a server, wherein the server may include, for example, a Web server or a cloud server. The system 100 may include a processor 102 that is adapted to execute stored instructions, as well as a memory device 104 that stores instructions that are executable by the processor 102. The processor 102 may be a single core processor, a multi-core processor, a computing cluster, or any number of other configurations. The memory device 104 can include random access memory (RAM), read only memory (ROM), flash memory, or any other suitable memory systems. The stored instructions executed by the processor 102 may implement a method for monitoring applications in the wild using execution traces from multiple user devices according to a collective record and replay procedure. The processor 102 may be connected through a bus 106 to one or more input and output devices.

The system 100 may include a storage device 108 adapted to store a collective record and replay module 110 and a runtime library 112. The collective record and replay module 110 can be used to monitor applications by logging execution traces from multiple user devices, while the runtime library 112 can store the execution traces relating to the applications. In some embodiments, the runtime library 112 may include a record runtime library and a replay runtime library. The storage device 108 may include a hard drive, an optical drive, a thumbdrive, an array of drives, or any combinations thereof. Moreover, the storage device 108 may also be adapted to store an API 114 and any number of applications 116. The applications 116 may communicate with each other through the API 114.

A human-machine interface (HMI) 118 may connect the system 100 to any number of user-interface devices 120, such as a touchscreen, a speaker, or a pointing device, among others. The system 100 may be linked through the bus 106 to a display interface 122 adapted to connect the system 100 to a display device 124. The display device 124 may include a computer monitor or a display screen of a mobile device, among others.

A network interface controller (NIC) 126 may be included to connect the system 100 through the bus 106 to a network 128. Through the network 128, Web-based applications 130 may be downloaded and stored within the computer's storage device 108, or may be accessed through a Web browser. The Web-based applications 130 may be stored on a remote server or computing device. The system 100 may also be communicably coupled to multiple user devices (not shown) through the network 128. Moreover, the system 100 may download and record logs relating to API calls from the multiple user devices through the network 128. Further, the system 100 may be a server or other computing device configured to provide a centralized location for the recording and replaying of a number of execution traces for an application from a number of user devices. The number of execution traces may be sequences of API calls and non-deterministic data related to the API calls made by an application. In various embodiments, partial execution traces may be recorded instead of full execution traces in order to reduce the overhead. Moreover, data relating to a particular execution trace may be recorded, including both parameters passed to the API and data returned from the API.

Figure 2:
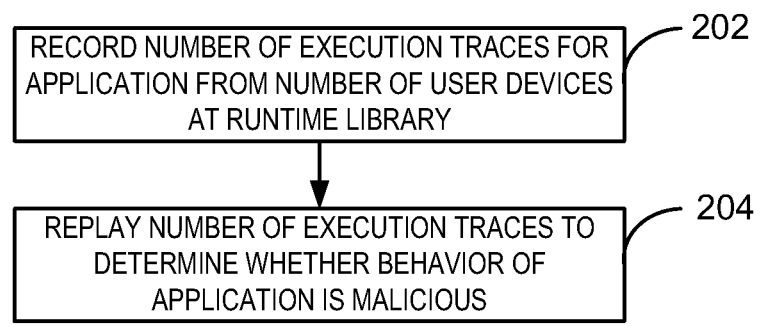
FIG. 2 is a process flow diagram showing a method for application monitoring through collective record and replay.

FIG. 2 is a process flow diagram showing a method 200 for application monitoring through collective record and replay. The method begins at block 202 with the collective recording of a number of execution traces for an application from a number of user devices at a runtime library. The recorded execution traces may relate to a sequence of API calls and a number of non-deterministic data associated with the API calls. Non-deterministic data may include any data that is variable or inconstant, such as data that is typed into the user device directly by the user, multiple-choice data, or any type of user-private data. For example, non-deterministic data may include a name, a day of the week, a day of the month, a gender, an age, a phone number, an email address, a contact list, a message inbox, a message outbox, a global positioning system (GPS) location, a birthday, or a credit card number, among others. Moreover, the user devices from which the execution traces are recorded may include any types of computing devices, such as mobile devices, desktop computers, laptop computers, electronic readers, tablets, televisions, or gaming devices, among others. Moreover, any computing system which utilizes any type of application or program may be used in conjunction with the method 200. For example, the user devices may also include systems in cars or homes that are configured to perform any of a variety of different functions in response to execution traces generated through applications or programs.

In various embodiments, full execution traces may not be recorded but, rather, partial execution traces may be probabilistically recorded. For example, the probability of recording an execution trace may be a fixed value for all API calls or may be an API-independent variable. Moreover, the recorded data may include data relating to a particular API call, such as parameters passed to the API and data returned from the API.

The recording of the number of execution traces from the number of user devices within the runtime library may be performed at any level of the application stack, i.e., at any interface. The interface may be chosen in order to minimize the recording overhead on the client, wherein the recording overhead may be characterized by the amount of time, space, and energy consumed by the recording process. For example, in some embodiments, the recording of the execution traces, or the interposing on the events executed by a particular application, may be performed at the level of the native platform libraries. However, the method 200 is not limited to the interposing on events at the level of the native libraries but, rather, may be implemented at any interface level.

Recording the number of execution traces from the number of user devices may include sending some number of execution traces from each of the number of user devices to the runtime library. The runtime library may be configured to record the execution traces within a memory device, wherein the memory device may be located within the runtime library or may be communicably coupled to the runtime library, such as through a wireless or wired connection. For example, the memory device may include the storage device 108 or memory device 104 of the system 100 discussed with respect to FIG. 1. Moreover, the runtime library may be connected to the user devices through a network, such as, for example, a wide area network (WAN) or a local area network (LAN).

Furthermore, in some embodiments, the runtime library may be replaced with two separate runtime libraries, including a record runtime library and a replay runtime library. The record runtime library, or log transferring module, may run on each user device in conjunction with the application. In various embodiments, the record runtime library may be used to record one or more execution traces of an application on a particular user device. Based on configurations, the record runtime library may either immediately send the recorded execution traces to a central server or wait until the user device is connected to a power supply or a non-cellular network, for example, to send the recorded execution traces. In various embodiments, the replay runtime library may run on the central server. For each potentially-incomplete execution trace, the replay runtime library may attempt to utilize the recorded API data first if it is available in the execution trace. Otherwise, the replay runtime library may leverage the recorded data from the same API from other execution traces in order to reproduce the full execution trace from the partially-recorded execution trace.

The runtime library may record the number of execution traces from the number of user devices by redirecting a number of application API calls from an API to the runtime library, wherein the API may include a native library or any other type of application programming interface. The API may be the module that is normally responsible for recording and executing API calls from applications. Once the runtime library has received and recorded the redirected API calls, the API calls may be sent back to the user devices to be executed as normal. A network may be configured to communicably couple the runtime library, the application, the API, and the memory device, or any combinations thereof. Furthermore, the application and the API may be physically colocated within a user device, while the memory device and the runtime library may be physically colocated within a centralized server.

In various embodiments, the runtime library may probabilistically log, or record, the number of execution traces for a given event from the number of user devices, wherein the given event may include a specific function of an application. Moreover, the probabilistic logging of the number of execution traces may include determining a probability that a particular execution trace relating to a particular application will be recorded from an individual user device. Thus, the performance overhead for the method 200 may be shared between multiple user devices in order to decrease the burden on the users. In some embodiments, the lower the probability that a particular execution trace may be recorded from an individual user device, the lower the burden on the user. Moreover, a lower probability of recording a particular event or execution trace from a particular user device may correspond to a lower total number of recorded execution traces from the user devices.

Further, a variety of additional information relating to the API calls from the number of user devices may be recorded by the runtime library. For example, information about where in the application, or program, a particular API call originated may be stored by the runtime library in order to enable the replaying of the execution traces within the API call at block 204. A number of methods for recording such information may be employed, including, for example, tracking the application's execution history precisely using a path profiling algorithm or computing a hash of the call stack at the time when the function was invoked. Moreover, a timestamp relative to the start of the application may be recorded in order to track additional information pertaining to a particular API call.

In some embodiments, the recording of asynchronous events may be accomplished by intercepting the API through which the particular application registers the callback function. This is possible because a callback registration may be used to deliver such asynchronous events. The runtime library may then replace the reference to the callback function with a reference to a recording function in the runtime library. This ensures that, when the callback is invoked from the library code, the runtime library will be notified and may record the information relating to the particular callback.

At block 204, the number of execution traces may be replayed to determine whether a behavior of the application is malicious. The runtime library may obtain the recorded execution traces by reading the execution traces from the memory device. The runtime library may then replay the number of execution traces by recombining each of the number of execution traces recorded from each of the number of user devices in order to generate a replay of an event relating to the application. The replaying of the execution traces may be performed in a manner that maintains the original ordering and latency of API calls within each execution trace. One execution trace may be replayed at a time. When there is an API call in the execution for which there is no recorded data, recorded data of the same API from other execution traces may be combined to generate the data for the replay procedure. This may be repeated for each execution trace in the set of execution traces reported to the central server. Moreover, in some embodiments, replaying the number of execution traces may include executing an API call using the number of execution traces recorded by the runtime library and utilizing a result of the API call to analyze the behavior of the application.

Once the number of execution traces have been recombined and replayed, the recombined execution traces may be analyzed in order to determine whether the behavior of the application is malicious. The behavior of the application may be considered to be malicious if the application utilizes any non-deterministic data in an unauthorized manner or for an unexpected purpose, wherein the unexpected purpose may include any function that is not approved or authorized by a user or a service provider, or both. For example, a malicious application may share the non-deterministic data with an unapproved third party in an unauthorized manner.

The method 200 is not intended to indicate that the steps of the method 200 are to be executed in any particular order or that all of the steps are to be included in every case. Further, steps may be added to the method 200 according to the specific application. For example, once the execution traces have been replayed at block 204, the recombined execution traces may be sent to a separate device through a network to be analyzed. For example, the separate device may analyze the recombined execution traces using a specific program that is configured to determine the behavior of the application. The separate device may be utilized by the particular service provider for each type of user device. Moreover, a particular service provider may determine whether to remove a particular application from the user devices, or block the particular application from the marketplace, based on the information obtained from the recombined execution traces.

Figure 3:
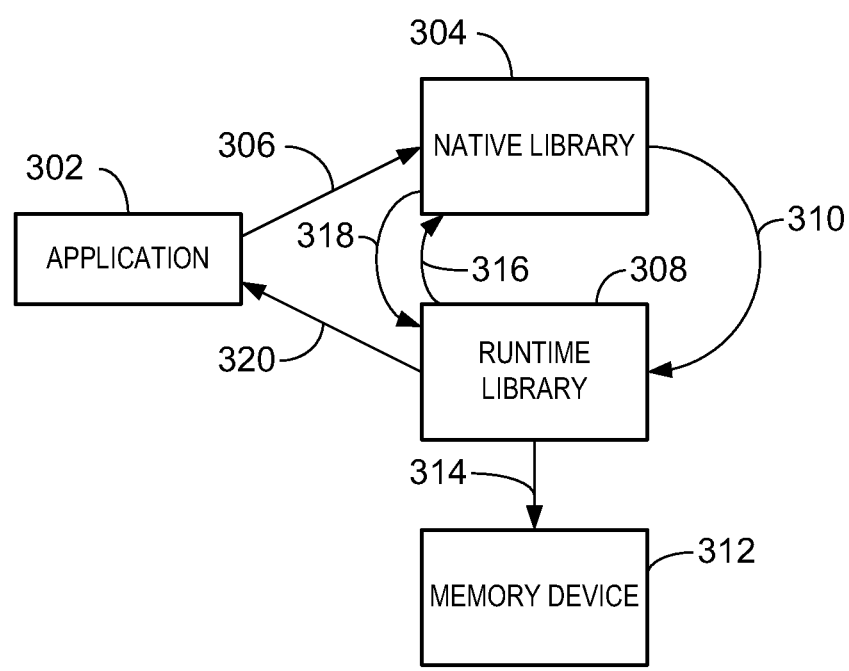
FIG. 3 is a block diagram of an exemplary system that may be used to monitor applications through the collective recording of execution traces.

FIG. 3 is a block diagram of an exemplary system 300 that may be used to monitor applications through the collective recording of execution traces. The system 300 may include an application 302, wherein the application 302 is a program that operates within a number of user devices. The application 302 may send a number of API calls to a native library 304 from a number of different user devices, as indicated by the arrow 306. In some embodiments, the native library 304 may be the particular API that has been chosen to interpose on application events. Moreover, the native library 304 may be a module that is configured to store, prepare, and execute API calls received from any of a number of applications, including the application 302. Further, each of the API calls may include a number of execution traces relating to a particular application event and non-deterministic data.

A runtime library 308 may be configured to redirect the API calls from the native library 304 to the runtime library 308, as indicated by the arrow 310. The runtime library 308 may be a module that is configured to implement the collective record and replay method described with respect to FIG. 2. The runtime library 308 may store the number of execution traces within a memory device 312, as indicated by the arrow 314. The memory device 312 may include random access memory (RAM), read only memory (ROM), or flash memory, among others. For example, the memory device 312 may include the storage device 108 or memory device 104 of the system 100 discussed with respect to FIG. 1.

The runtime library 308 may also communicate directly with the native library 304. In some embodiments, the runtime library 308 may send the API calls to the native library 304, as indicated by the arrow 316, in order to enable normal execution of the API calls. Moreover, the native library 304 may send the result of each API call back to the runtime library 308, as indicated by the arrow 318. The runtime library 308 may then inform the application 302 of the result of each of the API calls from each of the user devices, as indicated by the arrow 320. In addition, the runtime library may record the result of each API call within the memory device 312.

The native library 304 may be colocated within a particular user device, while the runtime library 308 may be located within a server or other device that is wirelessly connected to the native library 304 through a network connection. Moreover, the runtime library 308 may be connected to multiple distinct native libraries located on multiple user devices, wherein the multiple user devices are configured to execute the functions of the application 302. In this case, the recording of the execution traces may be performed according to several different methods depending on the settings and capabilities of each user device. For example, if a user device has continuous, unlimited access to the Internet, the native library 304 within the user device may transmit the log of an execution immediately after the program execution ends. On the other hand, if a user device has expensive or bandwidth-limited access to the Internet, logs from API calls may be stored and transmitted in a batch when a less expensive connection becomes available.

Figure 4:
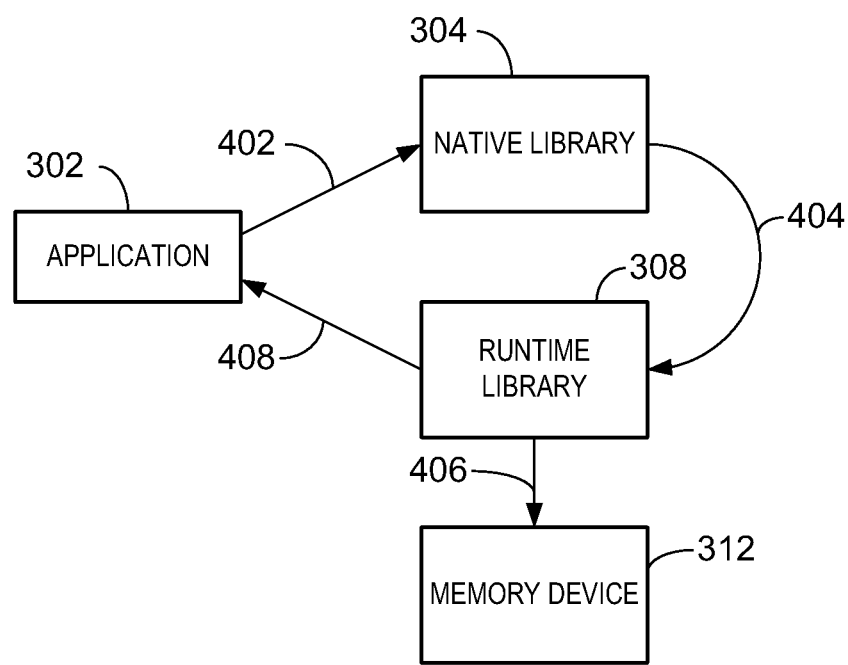
FIG. 4 is a block diagram of an exemplary system that may be used to monitor applications through the replay of collectively-recorded execution traces.

FIG. 4 is a block diagram of an exemplary system 400 that may be used to monitor applications through the replay of collectively-recorded execution traces. Like numbered items are as described with respect to FIG. 3. The replay of the recorded execution traces may be initiated by the application 302, which may send API calls from a number of user devices to the native library 304, as indicated by the arrow 402. The API calls may be once again redirected from the native library 304 to the runtime library 308, as indicated by the arrow 404. The runtime library 308 may then read the recorded information, including the execution traces, pertaining to the particular API calls from the memory device 312, as indicated by the arrow 406.

The runtime library 308 can select one of the recorded inputs it has available for the particular API call at that program point and directly fill in the output data from the log, i.e., from the memory device 312. However, this selection process may have some degree of imprecision, since the recorded inputs stored within the memory device 312 may not be precise. In addition, due to the probabilistic nature of the recording process described with respect to FIG. 3, it is possible that multiple recorded events may be appropriate for a particular API call, or that no recorded events may be available for a particular API call.

If no recorded events are available for a particular API call, an input may be synthesized using random or crafted data, an appropriate input may be derived using a technology such as symbolic execution, or the API call may be stalled until an appropriate event is recorded by some client. Moreover, in order to replay asynchronous events, the runtime library 308 may call corresponding callbacks from the memory device 312 with recorded input parameters at certain times. The callback time may be dictated by the original ordering and latency of the API calls within the execution trace. Further, once the runtime library 308 has retrieved the recorded input information, including the recombined execution traces, normal execution of the API call event may continue at the application 302 on the number of user devices, as indicated by the arrow 408.

Figure 5:
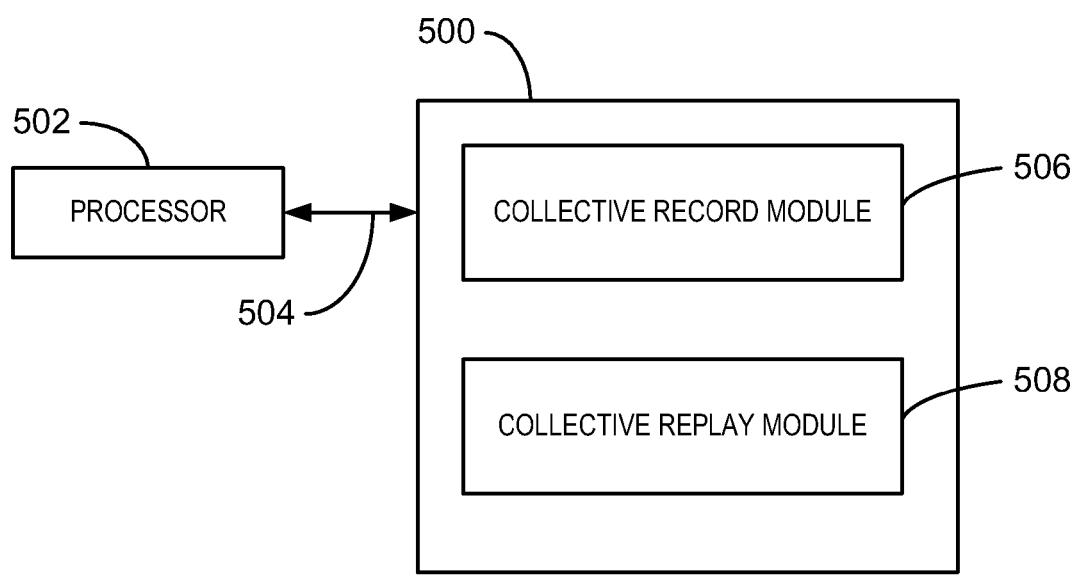
FIG. 5 is a block diagram showing a tangible, computer-readable medium 500 that stores code adapted to monitor potentially-malicious applications.

FIG. 5 is a block diagram showing a tangible, computer-readable medium 500 that stores code adapted to monitor potentially-malicious applications. The tangible, computer-readable medium 500 may be accessed by a processor 502, for example, over a computer bus 504. Furthermore, the tangible, computer-readable medium 500 may include code configured to direct the processor 502 to perform the steps of the current method. The various software components discussed herein may be stored on the tangible, computer-readable medium 800, as indicated in FIG. 5. For example, a collective record module 506 may be configured to record a number of execution traces for an application from a number of user devices, wherein the number of execution traces relate to user-private, non-deterministic data. A collective replay module 508 may also be configured to recombine and replay the application event that is defined by the number of recorded execution traces. The result obtained by the collective replay module 508 may then be used to determine whether the application violates the privacy of users or the security policies of service providers by utilizing the non-deterministic data in an unauthorized manner. Further, the tangible, computer-readable medium 500 may also include any number of additional software components not shown in FIG. 5.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A system for application monitoring through collective record and replay, comprising:
 a processor; and
 a memory comprising a memory storage device to store a runtime library of a primary user device that, when initiated at the primary user device, cause the processor to:
  receive an aggregate of distinct execution traces of an application derived from execution traces originating from a plurality of other user devices, wherein the aggregate of execution traces are redirected from an application programming interface (API) call from each of the other user devices, through an aggregation service, to the runtime library of the primary user device;
  record the aggregation of execution traces in the memory wherein the aggregate execution traces are recorded from the plurality of user devices based on an assigned probability dictating a number of execution traces which are recorded from each user device; and
  replay the aggregation of execution traces to determine whether the application is functioning as expected by combining each of the aggregation of distinct execution traces to generate a replay of an event relating to the application.

2. The system of claim 1, wherein the aggregate of execution traces comprises a sequence of API calls and non-deterministic data related to the API calls potentially including a security risk.

3. The system of claim 2, wherein the plurality of non-deterministic data comprises a plurality of variable data, a plurality of user-private data, or any combination thereof.

4. The system of claim 3, wherein the plurality of user-private data comprises a name, a day of the week, a day of the month, a gender, an age, a phone number, an email address, a contact list, a message inbox, a message outbox, a global positioning system (GPS) location, a birthday, or a credit card number, or any combinations thereof.

5. The system of claim 1, wherein the replay the aggregate of execution traces comprises scanning the application to determine whether a behavior of the application creates a security risk, and wherein the replay is initiated by a user.

6. The system of claim 1, wherein the aggregate of execution traces comprises an aggregate of partial execution traces.

7. The system of claim 6, wherein the runtime library is configured to replay the aggregate of partial execution traces by combining the aggregate of partial execution traces with recorded data of the API from other execution traces.

8. The system of claim 1, wherein receiving the aggregate of execution traces comprises receiving an aggregation of execution traces from the plurality of other user devices through a network to the runtime library of the primary user device.

9. The system of claim 1, wherein the assigned probability dictates the number of execution traces which are recorded based on a desired performance overhead of the collective recording procedure.

10. A device for application monitoring through collective record and replay, comprising a processor to:
receive an aggregate of distinct execution traces, derived from execution traces originating from a plurality of user devices of an application from a plurality of user devices;
record the aggregation of execution traces on the memory device, wherein the aggregation of execution traces are recorded from the plurality of user devices based on an assigned probability dictating a number of execution traces which are recorded from each user device; and
replay the aggregation of execution traces to determine whether the application is functioning as expected by combining each of the plurality of distinct execution traces to generate a replay of an event relating to the application.

11. The device of claim 10, wherein the aggregation of execution traces are received by redirecting an application programming interface (API) call from each of the user devices, through an aggregating service, to the processor of the device, and wherein the aggregation of execution traces comprises a sequence of API calls and non-deterministic data related to the API calls.

12. The device of claim 11, wherein the plurality of non-deterministic data comprises a plurality of variable data, a plurality of user-private data; or any combination thereof.

13. The device of claim 10, wherein the aggregation of execution traces comprises a plurality of partial execution traces.

14. The device of claim 13, wherein the processor is to replay the aggregation of partial execution traces by combining the aggregation of partial execution traces with recorded data of the API from other execution traces.

15. The device of claim 10, wherein the assigned probability dictates the number of execution traces which are recorded based on a desired performance overhead of the collective recording procedure.

16. A method for application monitoring through collective record and replay, comprising:
recording an aggregate of distinct execution traces, derived from execution traces originating from a plurality of instances of an application running on a plurality of user devices at a runtime library local to one of the plurality of user devices, wherein the aggregation of execution traces are recorded from the plurality of user devices based on an assigned probability dictating a number of execution traces which are recorded from each user device;
combining, at the user device having the local runtime library, the aggregation of distinct execution traces recorded from each of the plurality of user devices; and
replaying, at the user device having the local runtime library, the aggregation of execution traces to determine whether a behavior of the application creates a security risk.

17. The method of claim 16, wherein the aggregation of execution traces relates to a plurality of non-deterministic data potentially including a security risk, and wherein recording the aggregation of execution traces for the application comprises redirecting an application programming interface (API) call from each of the user devices, through an aggregating service, to the local runtime library, and logging the aggregation of execution traces relating to the API call.

18. The method of claim 16, wherein replaying the aggregation of execution traces comprises analyzing the aggregation of execution traces recorded within the runtime library to determine whether the application is utilizing the plurality of non-deterministic data in an unauthorized manner, and wherein utilizing the plurality of non-deterministic data in the unauthorized manner comprises sharing the plurality of non-deterministic data with an unapproved third party.

19. The method of claim 16, wherein the assigned probability dictates the number of execution traces which are recorded based on a desired performance overhead of the collective recording procedure.

* * * * *